United States Patent
Cole, III (10) Patent No.: US 9,468,838 B2
(45) Date of Patent: Oct. 18, 2016

(54) ROTATABLE FOOTPLATE INTEGRATED WITH BEARING ASSEMBLY IMBEDDED IN A SINGLE-BOARD SPORT BOARD

(71) Applicant: Charles D. Cole, III, Greenvile, SC (US)

(72) Inventor: Charles D. Cole, III, Greenvile, SC (US)

(*) Notice: Subject to any disclaimer, the term of this patent is extended or adjusted under 35 U.S.C. 154(b) by 0 days.

(21) Appl. No.: 14/982,622

(22) Filed: Dec. 29, 2015

(65) Prior Publication Data

US 2016/0107069 A1    Apr. 21, 2016

Related U.S. Application Data

(63) Continuation of application No. 14/629,112, filed on Feb. 23, 2015, now Pat. No. 9,248,365, which is a continuation of application No. 13/829,419, filed on Mar. 14, 2013, now Pat. No. 8,979,097.

(51) Int. Cl.
| | |
|---|---|
| *A63C 10/18* | (2012.01) |
| *A63C 5/03* | (2006.01) |
| *A63C 5/12* | (2006.01) |
| *A63C 10/14* | (2012.01) |
| *A63C 5/06* | (2006.01) |
| *F16C 19/16* | (2006.01) |
| *G05G 1/40* | (2008.04) |

(52) U.S. Cl.
CPC ............. *A63C 10/18* (2013.01); *A63C 5/03* (2013.01); *A63C 5/06* (2013.01); *A63C 5/128* (2013.01); *A63C 10/14* (2013.01); *F16C 19/16* (2013.01); *F16C 19/163* (2013.01); *G05G 1/40* (2013.01); *A63C 2203/40* (2013.01); *A63C 2203/54* (2013.01); *Y10T 74/20528* (2015.01)

(58) Field of Classification Search
CPC ........ A63C 10/18; A63C 10/24; A63C 5/03; B62B 15/00; B62B 13/16
See application file for complete search history.

(56) References Cited

U.S. PATENT DOCUMENTS

| | | | | |
|---|---|---|---|---|
| 6,491,310 B1* | 12/2002 | Work | ................. | A63C 10/14 280/14.24 |
| 7,832,742 B1* | 11/2010 | Duggan | ................. | A63C 10/14 280/14.23 |

* cited by examiner

*Primary Examiner* — John Walters
*Assistant Examiner* — James Triggs
(74) *Attorney, Agent, or Firm* — Khorsandi Patent Law Group, A Law Corporation; Marilyn R. Khorsandi (57) ABSTRACT

Exemplary embodiments of the present invention would provide a rotatable footplate integrated with a corresponding bearing and well assembly that is imbedded into, screwed into, or otherwise, integrally a part of, a single-board sports board, such as a snowboard.

7 Claims, 7 Drawing Sheets

ROTATABLE FOOTPLATE INTEGRATED WITH BEARING ASSEMBLY IMBEDDED IN A SINGLE-BOARD SPORT BOARD

CROSS REFERENCE TO RELATED APPLICATIONS

The present application is a continuation of, and claims priority to, Parent application, U.S. patent application Ser. No. 14/629,112, titled "ROTATABLE FOOTPLATE INTEGRATED WITH A BEARING ASSEMBLY IMBEDDED IN A SINGLE-BOARD SPORT BOARD," filed on Feb. 23, 2015, which is a continuation application of, and which claims priority to, the Grandparent application, U.S. patent application Ser. No. 13/829,419, titled "ROTATABLE FOOTPLATE INTEGRATED WITH A BEARING ASSEMBLY IMBEDDED IN A SINGLE-BOARD SPORT BOARD," filed on Mar. 14, 2013 (now Issued U.S. Pat. No. 8,979,097, issued Mar. 17, 2015), the entire contents and disclosures of all of which are incorporated in full herein as if fully stated herein.

FIELD OF THE INVENTION

The field of the present invention is single-board sports boards, such as snow boards, and more particularly, rotatable footplates integrated with a bearing assembly imbedded in a single-board sports board.

SUMMARY OF THE INVENTION

Exemplary embodiments of the present invention would provide a rotatable footplate integrated with a corresponding bearing and well assembly that is imbedded into, screwed into, or otherwise, integrally a part of, a single-board sports board, such as a snowboard.

Reference herein to snowboards will be understood to be illustrative and exemplary and not a limitation of the present invention. Rather, exemplary embodiments of the present invention could be implemented without departing from the spirit of the present invention with any type of single-board sports board, such as, but not limited to, wakeboards, slalom water skis, surf boards, skateboards, and the like.

As will be understood by someone with ordinary skill in the art, single-board sports boarding comprises skillful applications of rotational, lifting, downward and angular pressures to maneuver a single-board sports board; descriptions hereinbelow regarding various rotational and/or directional pressures, are illustrative of actions for maneuvering the exemplary rotatable footplate/bearing/well assembly embodiments of the present invention and do not limit the types of other skillful interactions that may be applied by a boarder to maneuver a board.

As described further below, exemplary embodiments of the present invention would provide a single-board sports that comprises: a well comprising an interior race; a shaft comprising an exterior race; and a ball-bearing bearing assembly comprising a cylinder that houses a plurality of ball bearings, said ball-bearing assembly positioned between said interior race and said exterior race, said ball-bearing assembly presenting said plurality of ball bearings for rotational contact with said interior race and said exterior race; a footplate would be provided that would be integral to a top of the shaft. Exemplary embodiments would comprise the well at least partially below a top surface of the single-board sports board. In exemplary embodiments, the interior race and the exterior race would both be provided below the top surface of the single-board sports board.

Alternative exemplary embodiments would provide a single-board sports board rotational footplate assembly that would comprise: a well comprising an interior race around an interior circumference of the well; the well would further comprise threading around an exterior circumference of the well; a shaft comprising an exterior race; the shaft would underlie an integrated footplate; and a ball-bearing assembly that would comprise a cylinder that would house a plurality of ball bearings such that the ball-bearing assembly would be positioned between the interior race and the exterior race; the ball-bearing assembly would present the plurality of ball bearings for rotational contact with the interior race and the exterior race.

BRIEF DESCRIPTION OF THE DRAWINGS

These and other features of the present invention are more fully set forth in the following description of exemplary embodiments of the invention. The description is presented with reference to the accompanying drawings in which.

DETAILED DESCRIPTION OF THE INVENTION

Figure 1:
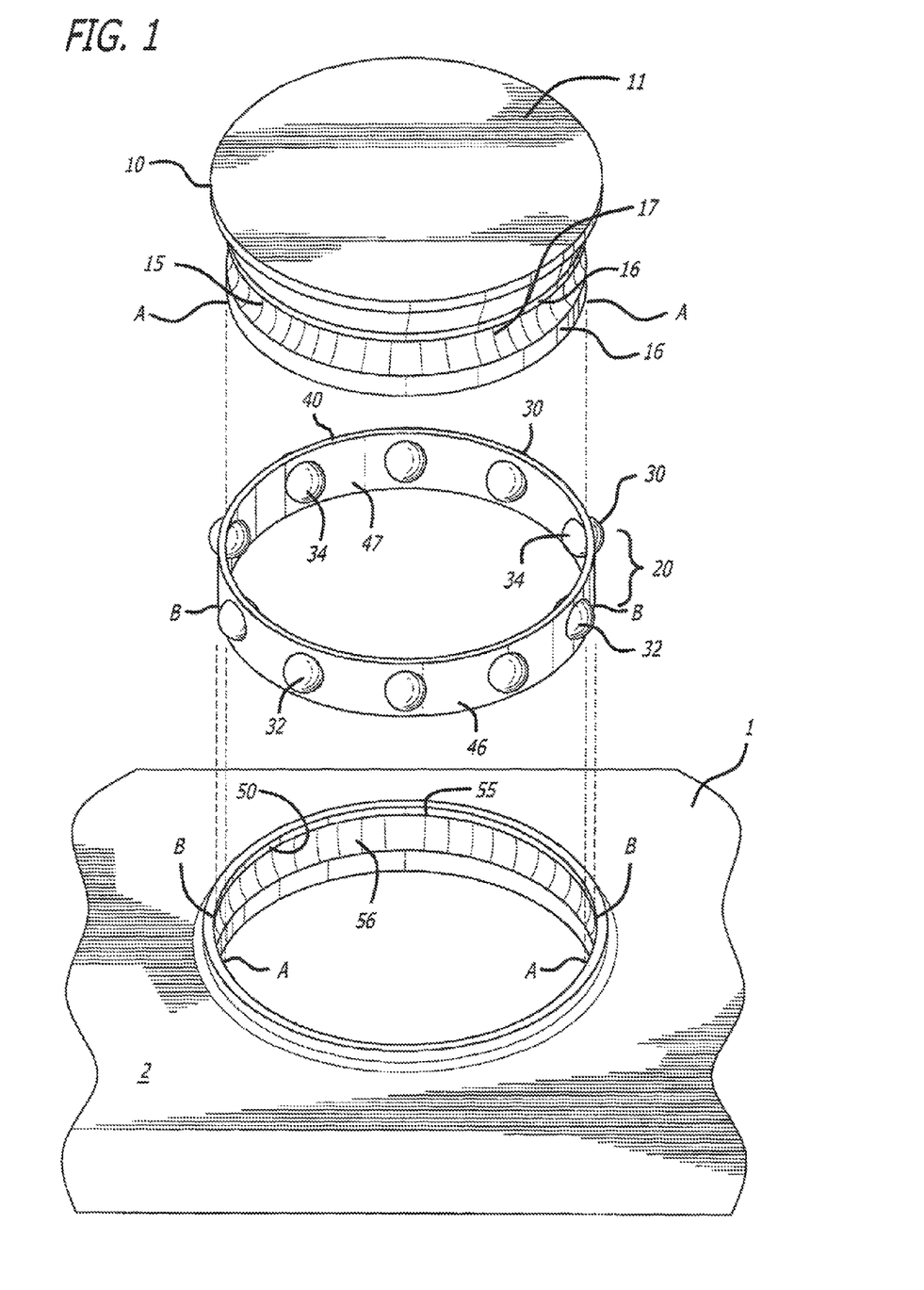
FIG. 1 is an exemplary exploded graphic depiction of an exemplary embodiment of the present invention.
Figure 14:
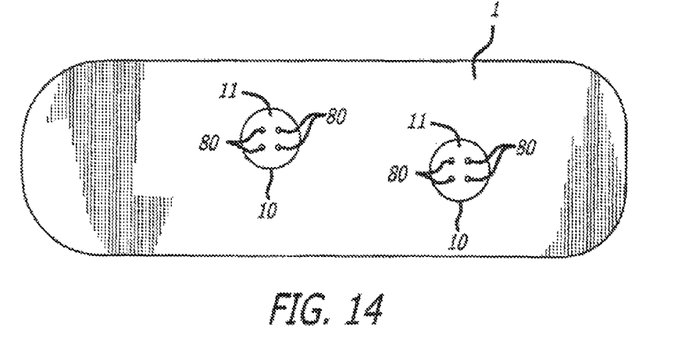
FIG. 14 is an exemplary graphic illustration depicting an exemplary top plan view of an exemplary single-board sports board with two illustratively depicted exemplary footplates in an exemplary embodiment of the present invention.

FIG. 14 is an exemplary graphic illustration depicting an exemplary top plan view of an exemplary single-board sports board 1 with two illustratively depicted exemplary footplates 10 (with underlying shaft 16/bearing assembly 20/well 50 assemblies—not shown in FIG. 14, but see, e.g., FIG. 1) in an exemplary embodiment of the present invention. As illustratively depicted in FIG. 14, an exemplary embodiment of the present invention would provide two exemplary footplates 10 (with underlying shaft 16/bearing assembly 20/well 50 assemblies) on a single-board sports board 1 (such as a snow board)—one for each foot of a boarder (such as a snow boarder).

As will be understood by someone with ordinary skill in the art, single board sports borders may use bindings to attach to a board, and then insert their shoed feet into the respective bindings. As illustratively depicted in FIG. 14 (and see also FIG. 11), exemplary threaded holes 80 would be provided in the exemplary footplate(s) 10 to facilitate securement of respective bindings (not shown) into each respective footplate (10).

Exemplary placement of exemplary footplates 10 (with integrated bearing assembly 20/well 50) on exemplary board 1 as depicted in FIG. 14 is illustrative and non-limiting; various alternative integrated footplate/bearing assembly placements on a board could be provided without departing from the spirit of the invention. Further, it would be possible to place a single exemplary integrated footplate/bearing assembly on a board without departing from the spirit of the present invention.

FIG. 1 is an exemplary exploded graphic depiction of an exemplary embodiment of the present invention. As depicted in FIG. 1, an exemplary embodiment of the present invention would provide an exemplary rotatable footplate 10 on an exemplary snowboard 1 in an exemplary embodiment of the present invention. As depicted in FIG. 1, an exemplary footplate 10 would comprise an exemplary footplate surface 11. An exemplary footplate 10 would be integrally molded onto an exemplary cylindrically-shaped shaft 16. An exemplary shaft race 15 would be provided around the exterior circumference of the exemplary cylindrically-shaped shaft 16.

The exemplary footplate 10 depicted in FIG. 1 is depicted in an exemplary circular shape. However, without departing from the spirit of the present invention, alternative exemplary footplates could be provided in other shapes (not shown), such as, for example, in a shape of a footprint; such alternatively-shaped footplates would be integrally molded onto an exemplary shaft, such as exemplary cylindrically-shaped shaft 16.

The exemplary shaft 16 is depicted in an exemplary cylindrical shape. However, without departing from the spirit of the present invention, alternative exemplary shafts could be provided in a generally cylindrical shape with facets (e.g., which, if viewed from above, would form a multisided polygon) that would provide an exemplary cylindrically-shaped shaft race, such as exemplary shaft race 15 that would form a cylinder around the alternative-shaped shaft.

Returning with reference to FIG. 1, FIG. 1 further depicts an exemplary bearing assembly 20 in an exemplary embodiment of the present invention that would fit (as depicted by exemplary lines B-B) within an interior circumference of an exemplary base 50, sometimes referred to herein as exemplary well 50.

As depicted in FIG. 1, the exemplary cylindrically-shaped shaft 16 would fit (as depicted by exemplary lines A-A) within an interior circumference of the exemplary bearing assembly cylinder 40 of the exemplary bearing assembly 20.

In the exemplary embodiment, the exemplary base 50/well 50 would be molded into, or would otherwise comprise an integral part of, a single-board sports board body (such as a snow board body). However, in alternative embodiments, a threaded hole could be bored into an existing snow board body; and an alternative exemplary well (not shown) would comprise exemplary exterior circumference threading (not shown) for fastening the exemplary alternative well into the exemplary threaded hole bored into the snow board body.

As depicted in FIG. 1, exemplary bearing assembly 20 would provide an exemplary bearing assembly cylinder 40 into which a plurality of exemplary ball bearings 30 would be rotatably held.

Exemplary bearing assembly 20 would comprise a tambourine-style equal-spaced placement of ball bearings 30 spaced around the exemplary bearing assembly cylinder 40. FIGS. 6-10 illustratively depict various close-up side perspective (FIGS. 6-7), top plan (FIG. 8) and side perspective cut-away views (FIGS. 9-10) of an exemplary bearing assembly cylinder 40.

As will be understood by someone with ordinary skill in the art, the illustrative tambourine-style equal-space placement of ball bearings 30 in exemplary bearing assembly 20 as illustratively depicted in FIG. 1 is illustrative and exemplary and is not a limitation of the present invention. Rather, there are other ways in which to provide a cylindrically-shaped bearing assembly without departing from the spirit of the present invention. For example, ball bearings could be provided with variable spacing in between the bearing seating-holes.

Figure 15:
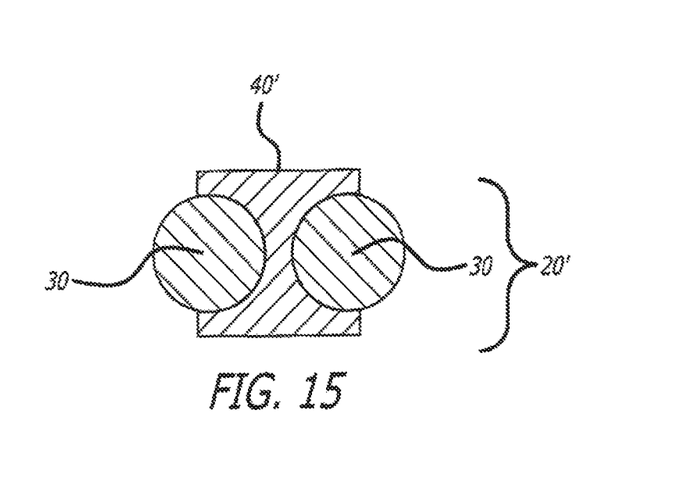
FIG. 15 is an exemplary graphic illustration of an exemplary partial cutaway view (along, e.g., line J-J as depicted in FIG. 16) of a portion of an alternative exemplary bearing assembly in an alternative exemplary embodiment of the present invention.
Figure 16:
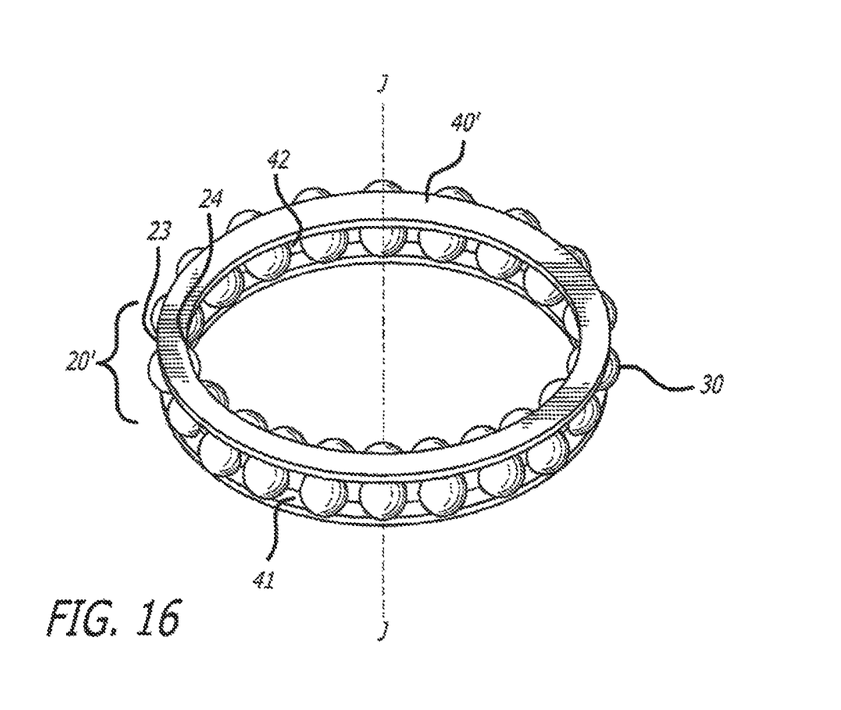
FIG. 16 is an exemplary graphic illustration of an exemplary perspective view of an alternative exemplary bearing assembly in an alternative exemplary embodiment of the present invention.

As a further alternative, an alternative bearing assembly could provide a continuous series of ball bearings as illustratively depicted in FIGS. 15 and 16. FIG. 15 is an exemplary graphic illustration of an exemplary partial cut-away view (along, e.g., line J-J as depicted in FIG. 16) of a portion of an alternative exemplary bearing assembly 20' in an alternative exemplary embodiment of the present invention; FIG. 16 is an exemplary graphic illustration of an exemplary perspective view of an alternative exemplary bearing assembly 20' in an alternative exemplary embodiment of the present invention. As depicted in FIGS. 15 and 16, such an alternative bearing assembly 20' could comprise an alternative exemplary bearing assembly cylinder 40' that would house on each opposing side a series of ball bearings 30. Such an alternative exemplary bearing assembly 20' would work similarly to the exemplary bearing assembly 20 described herein except that ball bearings around the interior 24 of the alternative bearing assembly 20' would be presented for contact with the exemplary shaft race 15 (depending on the pressure asserted on the relevant footplate); ball bearings around the exterior 23 of the alternative bearing assembly 20' would be presented for contact with the exemplary well race 55.

In the exemplary embodiment, the exemplary well 50 would be molded into a fiberglass snow board body; the exemplary cylindrically-shaped bearing assembly 20, and the exemplary footplate 10 and shaft 16 would comprise hardened nylon. In an alternative threaded-well embodiment (described above for threading an exemplary well into a threaded hole bored into an existing snowboard, the exemplary threaded-well could comprise hardened nylon. Further, as will be understood by someone with ordinary skill in the art, in other exemplary embodiments, the exemplary cylindrically-shaped bearing assembly 20, the exemplary footplate 10 and shaft 16, and the exemplary well 50 could comprise various materials, including but not limited to, for example, fiberglass, plastic, and/or other materials, whether now known or in the future discovered, without departing from the spirit of the present invention.

In the exemplary embodiment, the exemplary ball bearings would comprise steel ball bearings. However, as will be understood by someone with ordinary skill in the art, in alternative exemplary embodiments, ball bearings could comprise other materials, including without limitation, plastic, glass, other types of metals, and other types of materials, whether now known or in the future discovered, without departing from the spirit of the present invention.

Figure 2:
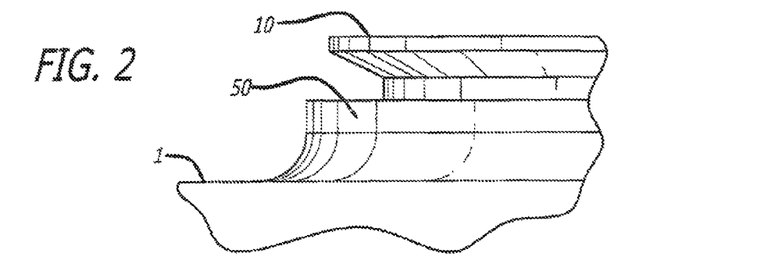
FIG. 2 is an exemplary graphic depiction of an exemplary partial side perspective view of an exemplary footplate seated in an exemplary well on an exemplary single-board sports board in an exemplary embodiment of the present invention.

FIG. 2 is an exemplary graphic depiction of an exemplary partial side perspective view of an exemplary footplate 10 seated in an exemplary well 50 on an exemplary single-board sports board 1 in an exemplary embodiment of the present invention.

Figure 3:
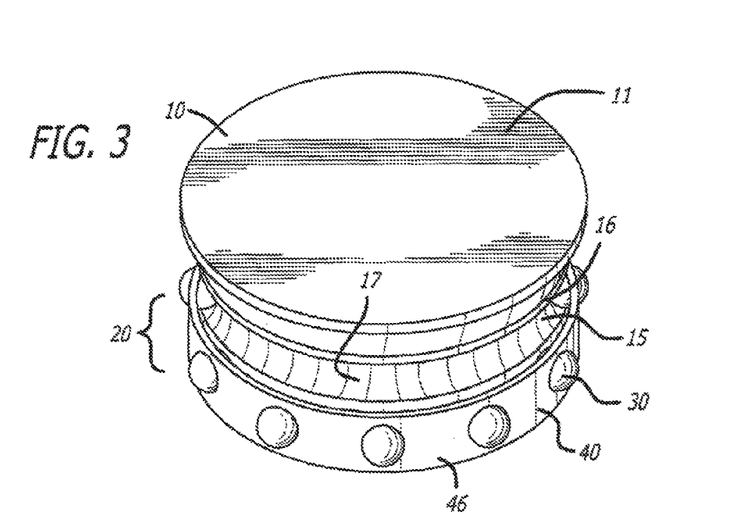
FIG. 3 is an exemplary graphic depiction of an exemplary partial exploded perspective view of an exemplary footplate/exemplary shaft and an exemplary ball-bearing assembly in an exemplary embodiment of the present invention.

FIG. 3 is an exemplary graphic depiction of an exemplary partial exploded perspective view of an exemplary footplate 10/exemplary shaft 16 and an exemplary ball-bearing assembly 20 in an exemplary embodiment of the present invention. FIG. 3 depicts an exemplary perspective view of exemplary ball bearings 30 seated in an exemplary bearing assembly cylinder 40 in an exemplary bearing assembly 20 with respect to an exemplary exterior race 15 (comprising an exemplary portion, such as, for example, an upper race lip 17) in an exemplary shaft 16 that underlies an exemplary footplate 10 (with exemplary footplate surface 11). As depicted in FIG. 3 (and see also, e.g., FIGS. 1, 5, 12 and 13) exemplary exterior race 15 (also sometimes referred to herein as an exemplary shaft race 15) would comprise a portion, such as, for example, an exemplary upper race lip 17, against which some portion of some of the exemplary ball bearings would sometimes contact.

The exemplary bearing assembly 20 would present one side (see, e.g., FIG. 12, element 34) of a ball bearing 30 seated within the exemplary bearing assembly cylinder 40 for contact with the exemplary shaft race 15, such as, for example, with exemplary upper race lip 17 at exemplary contact point 100.

Figure 4:
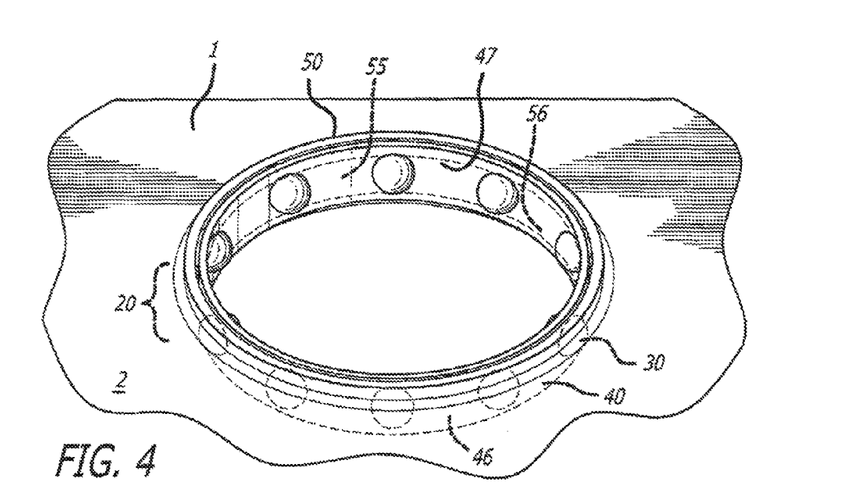
FIG. 4 is an exemplary graphic depiction of an exemplary perspective cutaway view (such as along line C-C depicted in FIG. 11) of an exemplary partial assembly of an exemplary ball-bearing assembly seated in an exemplary well in an exemplary embodiment of the present invention.

FIG. 4 is an exemplary graphic depiction of an exemplary perspective cutaway view (such as along line C-C depicted in FIG. 11) of an exemplary partial assembly of an exemplary ball-bearing assembly 20 (comprising exemplary ball bearings 30 seated in an exemplary bearing assembly cylinder 40) seated in an exemplary well 50 in an exemplary embodiment of the present invention. FIG. 4 depicts an exemplary perspective view of exemplary ball bearings 30 with respect to an exemplary interior race 55 around an exemplary interior circumference of the exemplary well 50 (sometimes referred to herein as the exemplary interior race 55 or the exemplary well race 55). As depicted in FIG. 4 (and see also, e.g., FIGS. 1, 5 and 12), exemplary interior race 55 would comprise a portion, such as, for example, an exemplary lower lip 56, against which some portion of some of the exemplary ball bearings would sometimes contact.

The exemplary bearing assembly 20 would present a side (see, e.g., FIG. 12, element 32) of a ball bearing 30 seated within the exemplary bearing assembly cylinder 40 for contact with the exemplary well race 55, such as, for example, with exemplary lower lip 56 at exemplary contact point 110.

As depicted in e.g., FIG. 1 and FIG. 4, the exemplary single-board sports board 1 would comprise an upper surface 2; the exemplary shaft race 15, the exemplary ball bearings, and the exemplary well race 55, when assembled, would be imbedded in, and in some exemplary embodiments, would be below the surface 2 of the board 1.

Figure 7:
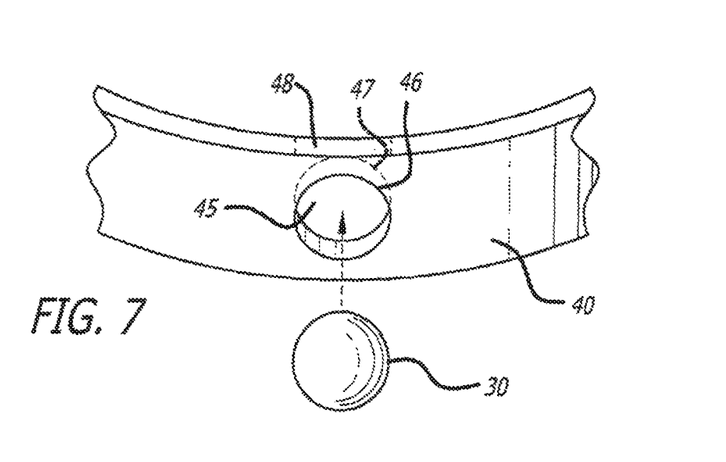
FIG. 7 is an exemplary graphic depiction of an exemplary partial perspective exploded view of an exemplary ball bearing with respect to an exemplary bearing assembly cylinder in an exemplary embodiment of the present invention.
Figure 8:
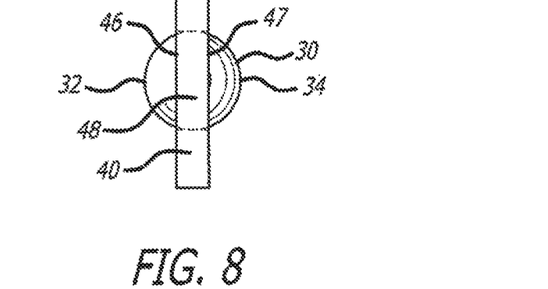
FIG. 8 is an exemplary graphic depiction of an exemplary partial top plan view of an exemplary bearing assembly cylinder in which an exemplary bearing is seated, in an exemplary embodiment of the present invention.
Figure 9:
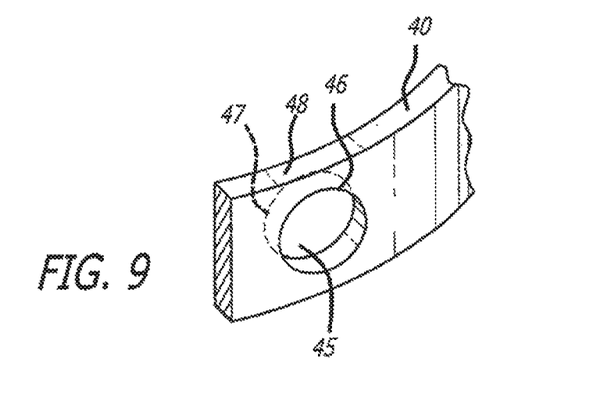
FIG. 9 is an exemplary graphic depiction of an exemplary partial perspective view of an exemplary bearing assembly cylinder in an exemplary embodiment of the present invention.
Figure 10:
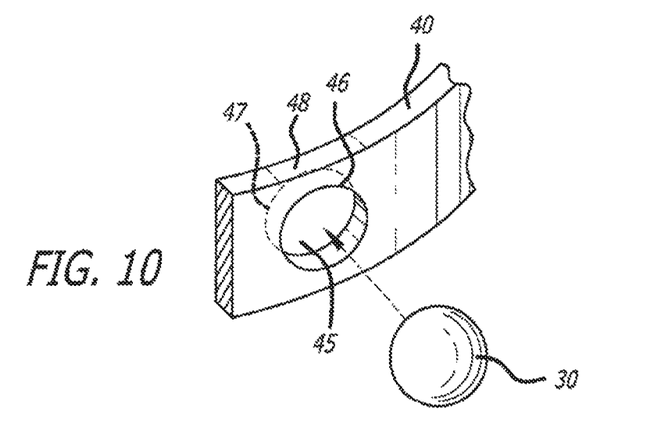
FIG. 10 is an exemplary graphic depiction of an exemplary partial perspective exploded view of an exemplary ball bearing with respect to an exemplary bearing assembly cylinder in an exemplary embodiment of the present invention.

FIGS. 6-10 are exemplary graphic depictions of various exemplary views of an exemplary bearing assembly cylinder 40 in an exemplary embodiment of the present invention. FIGS. 6-7 and 9-10 depict exemplary partial perspective views of an exemplary bearing assembly cylinder 40 in an exemplary embodiment of the present invention; FIGS. 7 and 10 further illustratively depict various partial perspective exploded views of an exemplary ball bearing 30 with respect to an exemplary bearing assembly cylinder 40 in an exemplary embodiment of the present invention. FIG. 8 depicts an exemplary partial top plan view of an exemplary bearing assembly cylinder 40 in which an exemplary bearing 30 is seated, in an exemplary embodiment of the present invention.

As depicted in FIGS. 6-7 and 9-10, an exemplary bearing assembly cylinder 40 would comprise exemplary bearing seating holes 45 bored through from one side surface (e.g. the exterior side surface 46) of the exemplary bearing assembly cylinder 40 to the opposing side surface (e.g. the interior side surface 47) of the exemplary bearing assembly cylinder 40. Exemplary bearing seating holes 45 would comprise a size sufficient to house an exemplary ball bearing 30 so that the exemplary ball bearing 30 would be freely rotatable inside the respective exemplary bearing seating hole 45.

As depicted in FIG. 8, an exemplary exterior surface 32 of an exemplary ball bearing 30 would protrude through the exemplary exterior side surface 46 of the exemplary bearing assembly cylinder 40; an exemplary interior surface 34 of an exemplary ball bearing 30 would protrude through the exemplary interior side surface 47 of the exemplary bearing assembly cylinder 40.

Figure 5:
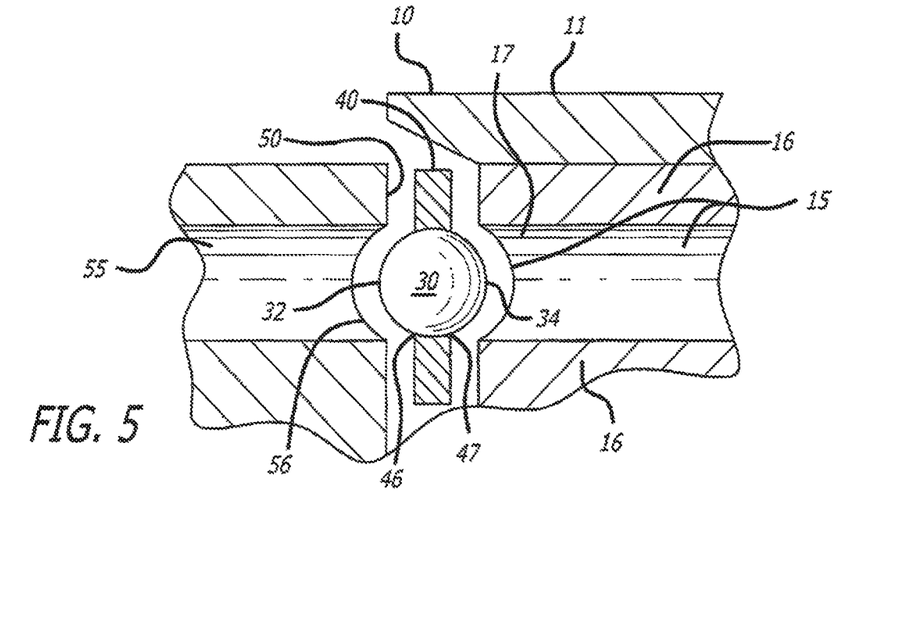
FIG. 5 is an exemplary graphic illustration of an exemplary partial side perspective cut-away view (along line C-C depicted in FIG. 11) of an exemplary assembly of an exemplary embodiment of the present invention.
Figure 6:
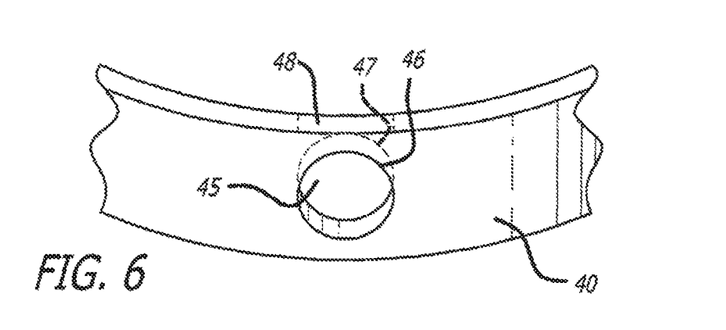
FIG. 6 is an exemplary graphic depiction of an exemplary partial perspective view of an exemplary bearing assembly cylinder in an exemplary embodiment of the present invention.

FIG. 5 is an exemplary graphic illustration of an exemplary partial side perspective cut-away view (along line C-C depicted in FIG. 11) of an exemplary assembly of an exemplary embodiment of the present invention. As depicted in FIG. 5, an exemplary exterior surface 32 of an exemplary ball bearing 30 would protrude through the exemplary exterior side surface 4 of the exemplary bearing assembly cylinder 40 for potential contact with an exemplary interior race 55 around an exemplary interior circumference of the exemplary well 50.

As further depicted in FIG. 5, an exemplary interior surface 34 of an exemplary ball bearing 30 would protrude through the exemplary interior side surface 47 of the exemplary bearing assembly cylinder 40 for potential contact with the exemplary exterior race 15 around the exemplary exterior circumference of the exemplary shaft 16.

Figure 11:
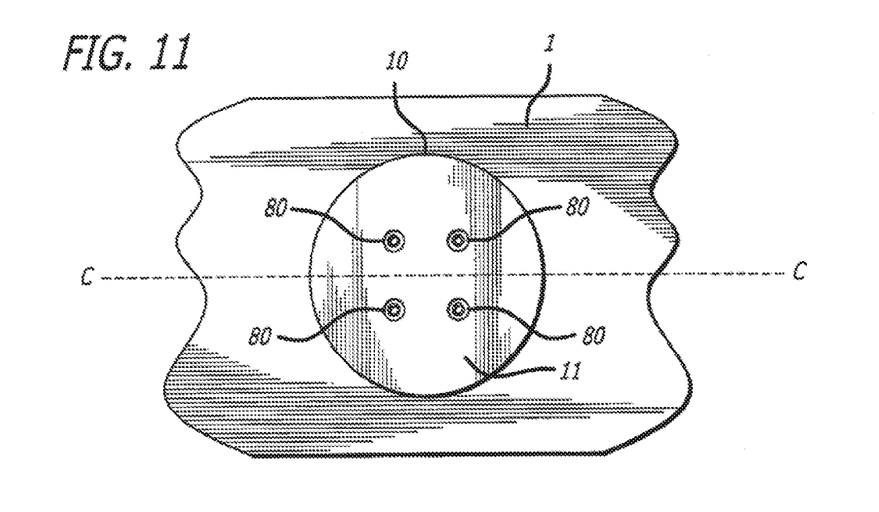
FIG. 11 is an exemplary top plan view of an exemplary top surface of an exemplary rotatable footplate on an exemplary snowboard in an exemplary embodiment of the present invention.
Figure 12:
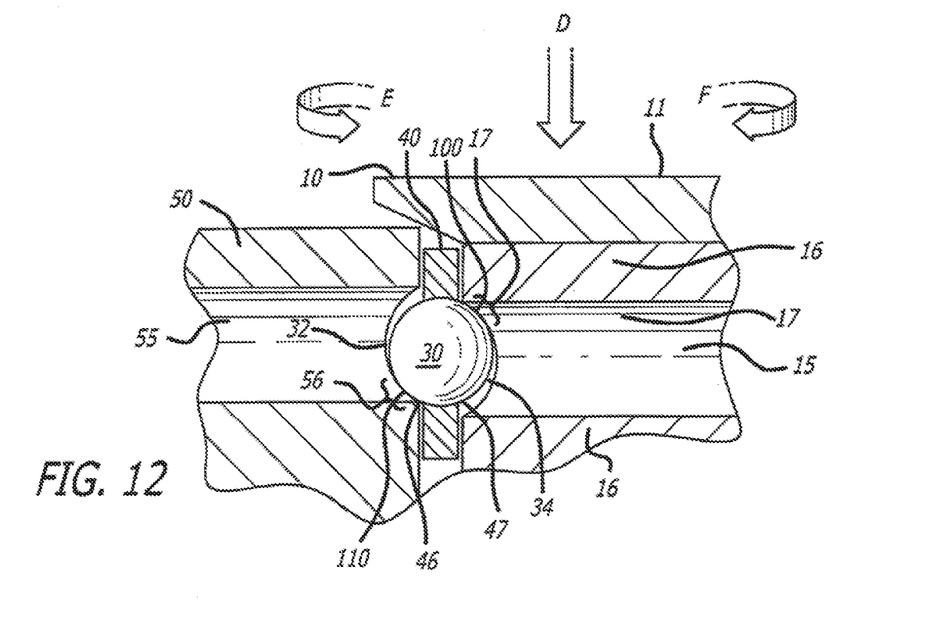
FIG. 12 is an exemplary graphic illustration of an exemplary close-up partial side perspective cut-away view (along line C-C depicted in FIG. 11) of an exemplary embodiment of the present invention.

FIG. 12 is an exemplary graphic illustration of an exemplary close-up partial side perspective cut-away view (along line C-C depicted in FIG. 11) of an exemplary embodiment of the present invention. As illustratively depicted in FIG. 12, if a downward pressure (such as by a snow boarder's foot) is applied to the exemplary footplate surface 11 of exemplary footplate 10, such as along line D, such a downward pressure would cause an exemplary contact point 100 between an exemplary portion, such as between an exemplary upper lip 17, of the exemplary exterior race 15, of the exemplary shaft 16 of the exemplary footplate 10 with an exemplary bearing 30, and would further cause an exemplary contact point 110 between exemplary bearing 30 and an exemplary portion, such as exemplary lower lip 56, of the exemplary interior race 55 of exemplary well 50. Accordingly, a downward pressure would cause similar exemplary contact points between the exemplary upper lip 17 of exemplary exterior race 15 with various of the exemplary bearings 30, and between the exemplary bearings 30, with the exemplary lower lip 56 of the exemplary interior race 55 of exemplary well 50 as further described below with respect to FIG. 13. Such various contact points under such a downward pressure on the exemplary footplate 10 would facilitate rotation in directions E or F, as the case may be, according to rotational twisting motions applied by an exemplary boarder's foot to the exemplary footplate 10.

FIG. 11 is an exemplary top plan view of an exemplary top surface of an exemplary rotatable footplate on an exemplary snowboard in an exemplary embodiment of the present invention. As illustratively depicted in FIG. 11, exemplary threaded holes 80 would be provided in an exemplary footplate 10. Exemplary threaded holes 80 would facilitate securement of respective bindings (not shown) into an exemplary footplate 10.

Figure 13:
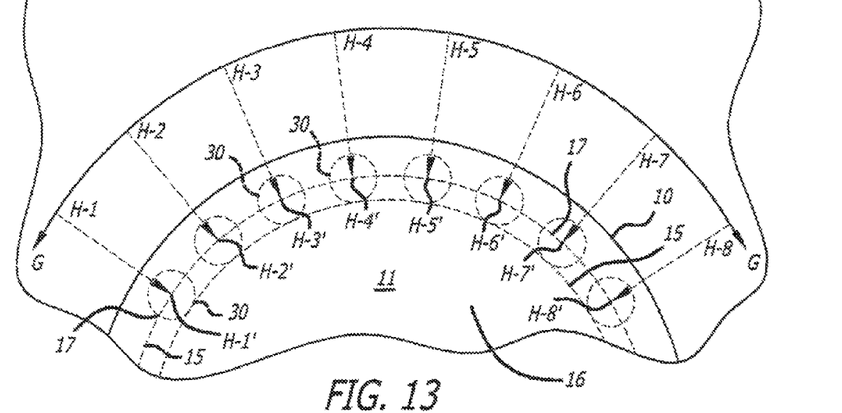
FIG. 13 is an exemplary graphic illustration depicting an exemplary partial top perspective view of an exemplary footplate 10 in an exemplary embodiment of the present invention.

FIG. 13 is an exemplary graphic illustration depicting an exemplary partial top perspective view of an exemplary footplate 10 in an exemplary embodiment of the present invention. FIG. 13 illustratively depicts exemplary ball bearings 30 under exemplary footplate surface 11 and under an upper race lip 17 of exemplary exterior race 15 of exemplary shaft 16. FIG. 13 further illustratively depicts an exemplary illustrative rotational line G-G of pressure that could be applied, such as, for example, by a boarder's foot, to exemplary footplate 10. FIG. 13 further illustratively depicts exemplary pressure points H-1-H-1', H-2-H-2', . . . H-8-H-8', created according to exemplary rotational line G-G, between various points (e.g., H-1', H-2' . . . H-8') along the upper race lip 17 of exemplary exterior race 15, and various exemplary ball bearings 30.

As illustratively depicted in FIG. 13, as a boarder (such as a snow boarder; not shown) rotationally applies pressure along exemplary rotational line G-G (a bi-directional rotational line, depicting that a boarder could choose to rotate clockwise or counterclockwise) to exemplary footplate 10, exemplary footplate 10 would tend to rotate in a direction (clockwise or counterclockwise, as the case may be according to the rotational direction of the boarder's foot) along rotational line G-G in view of pressure rotationally applied to the various points (e.g., H-1', H-2' . . . H-8') along the upper race lip 17 of exemplary exterior race 15. Such rotation in a direction (clockwise or counterclockwise, as the case may be) according to the rotational direction of the boarder's foot along rotational line G-G in view of pressure rotationally applied to the various points (e.g., H-1', H-2' . . . H-8') along the upper race lip 17 of exemplary exterior race 15 would cause respective contacts with, and resulting rotation of, the various exemplary ball bearings 30, which would cause exemplary rotation (clockwise or counterclockwise, as the case may be) of exemplary footplate 10. In view of such rotation of exemplary footplate 10, the exemplary boarder would be able to rotate their footing position on the board and would, thereby, facilitate maneuvering of the board 1.

As will be understood by someone with ordinary skill in the art, by a boarder rotationally repositioning the boarder's feet (binding/shoe/feet assemblies) in exemplary footplate/bearing/well assemblies of the present invention, the exemplary boarder would be able to maneuver the underlying board.

Returning with reference to FIG. 1, as will be understood by someone with ordinary skill in the art, there would be various ways in which to assemble the above-described exemplary footplate 10/shaft 16 assembly with an exemplary bearing assembly 20 (or with reference to FIG. 16, alternative bearing assembly 20'), and an exemplary base 50/well 50 (collectively, the disclosed components) such that, once assembled, the entire assembly would resist disassembly. One way in which to so assemble the disclosed components would be with a press fit.

Another way to so assemble the disclosed components would be, with reference to FIG. 4, to fit the exemplary cylinder 40 inside the exemplary well 50, and then put (e.g., pop them in with a slight force) the exemplary bearings 30 in their respective exemplary bearing seating holes 45 (see FIGS. 6-7 and 9-10), and then insert the exemplary shaft 16 inside the exemplary cylinder 40 (see FIG. 3) so that the exemplary shaft race 15 (see FIG. 3) is aligned with the exemplary bearings 30 (see e.g, FIG. 3 and FIG. 12). With the exemplary embodiment, as depicted, for example, in FIG. 8, the exemplary bearings would protrude slightly (see, e.g., bearing sides 32 and 34 in FIG. 8) from each side of the exemplary cylinder 40; with the bearings so protruding from each side of the exemplary cylinder 40, their sides would rest in the respective shaft race 15 and the exemplary well race 55 (as illustratively depicted, e.g., in FIG. 12) and would resist extraction of the exemplary shaft 16 and/or the exemplary cylinder 40 from the full assembly.

In an alternative exemplary embodiment (not shown), another way for assembling the disclosed components would be to provide a series of drop-in slots (and optionally, detents) (not shown) that when properly aligned, would facilitate inserting an exemplary cylinder 40 into an exemplary base 50/well 50, and would, when further properly aligned, facilitate inserting an exemplary footplate 10/shaft 16 inside the exemplary cylinder 40, and would, when further properly aligned, facilitate then dropping exemplary ball bearings through one or more slots into one or more one or more races 15 and/or 55 (and/or races 41 and 42 as depicted in an alternative exemplary cylinder 40' shown in FIG. 16) and/or into one or more openings in an exemplary cylinder 40; once exemplary bearings 30 and the exemplary footplate 10/shaft 16 are seated in their respective places, the exemplary bearings 30 would resist disassembly of the exemplary shaft 16 from the cylinder (e.g., 40 (FIG. 1) or 40' (FIG. 16)) and would resist disassembly of the exemplary cylinder (e.g., 40 (FIG. 1) or 40' (FIG. 16)) from the exemplary base 50/well 50.

Other ways to assemble the disclosed components would be used without departing from the spirit of the present invention.

Facsimile Reproduction of Copyright Material

A portion of the disclosure of this patent document contains material which is subject to copyright protection by the copyright owner, Charles D. Cole, III, and his successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A rotational footplate assembly for a sports board, said rotational footplate assembly comprising:
   a hollow member comprising a cylindrically-shaped interior wall, said cylindrically-shaped interior wall comprising an interior race around an interior circumference of said cylindrically-shaped interior wall, said hollow member at least partially housing within the interior circumference of said cylindrically-shaped interior wall, a shaft and a ball-bearing assembly, said hollow member at least partially imbedded below a top board surface of said sports board;
   said shaft comprising an exterior race, said shaft underlying an integrated footplate; and
   said ball-bearing assembly comprising a cylindrically-shaped device that houses a plurality of ball bearings, at least some portion of said ball-bearing assembly positioned between said interior race of said hollow member and said exterior race of said shaft, said ball-bearing assembly presenting at least some of said plurality of ball bearings for rotational contact with said interior race of said hollow member, said ball-bearing assembly presenting at least some of said plurality of ball bearings for rotational contact with said exterior race of said shaft, said hollow member accommodating freely-rotatable movement of said footplate according to freely-rotatable contact of at least some of said plurality of ball bearings with said exterior race of said shaft and further according to freely-rotatable contact of at least some of said plurality of ball bearings with said interior race of said hollow member.

2. The rotational footplate assembly for a sports board of claim 1, wherein said hollow member is formed in said sports board.

3. The rotational footplate assembly for a sports board of claim 1, wherein said hollow member is integrated with said sports board.

4. The rotational footplate assembly for a sports board of claim 1, wherein:
   said hollow member further comprises an exterior circumference, said exterior circumference further comprising threading, said threading corresponding to opposing threading in a receiving well formed at least partially below-surface of said sports board.

5. A sports board, said sports board comprising:
   a top sports board surface;
   a rotational footplate assembly at least partially imbedded in said sports board below said top sports board surface, said rotational footplate assembly comprising a hollow member, a ball-bearing assembly and a shaft, said hollow member at least partially housing said shaft and said ball-bearing assembly;
   wherein:
      said hollow member comprises a cylindrically-shaped interior wall, said cylindrically-shaped interior wall comprising an interior race around an interior circumference of said cylindrically-shaped interior wall, said hollow member at least partially housing said shaft and said ball-bearing assembly within the interior circumference of said cylindrically-shaped interior wall of said hollow member;
      said shaft comprises an exterior race, said shaft underlying an integrated footplate, said footplate comprising a top footplate surface;
      said ball-bearing assembly comprises a cylindrically-shaped device that houses a plurality of ball bearings, at least some portion of said ball-bearing assembly positioned between said interior race of said hollow member and said exterior race of said shaft, said ball-bearing assembly presenting at least some of said plurality of ball bearings for rotational contact with said interior race of said hollow member, said ball-bearing assembly presenting at least some of said plurality of ball bearings for rotational contact with said exterior race of said shaft, said hollow member accommodating freely-rotatable movement of said footplate according to freely-rotatable contact of at least some of said plurality of ball bearings with said exterior race of said shaft and further according to freely-rotatable contact of at least some of said plurality of ball bearings with said interior race of said hollow member, said hollow member further comprising an exterior circumference, said exterior circumference further comprising threading, said threading corresponding to opposing threading in a receiving well formed at least partially below-surface of said sports board.

6. The sports board of claim 5, wherein said hollow member is formed in said sports board.

7. The sports board of claim 5, wherein said hollow member is integrated with said sports board.

* * * * *